United States Patent Office 3,064,039
Patented Nov. 13, 1962

3,064,039
DIAMINE COMPOUNDS
Moses Wolf Goldberg, Upper Montclair, and Sidney Teitel, Nutley, N.J., assignors to Hoffmann-La Roche Inc., Nutley, N.J., a corporation of New Jersey
No Drawing. Filed May 8, 1958, Ser. No. 733,814
11 Claims. (Cl. 260—501)

This invention relates to diamine compounds. More particularly, the invention relates to diamine compounds which are represented by the following structural formula

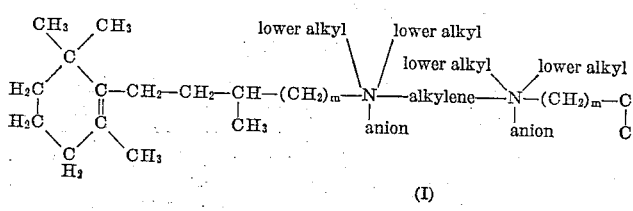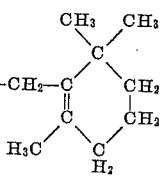

(I)

wherein $m$ is 0 or 1.

The lower alkyl groups in the above formula include straight chain and branch chain groups, for example, methyl, ethyl, propyl, isopropyl, butyl, isobutyl, amyl, hexyl and heptyl. The alkylene groups include straight chain and branched chain divalent saturated aliphatic hydrocarbon groups having 2 to 10 carbon atoms in the chain. The products may contain varying amounts of water of hydration. The anions are negative ions from organic or inorganic acids such as the hydrohalic or other mineral acids, arylsulfonic acids, etc., preferably bromide, chloride, iodide or p-toluene-sulfonate.

A preferred group of compounds within the above class may be represented by the following structural formula

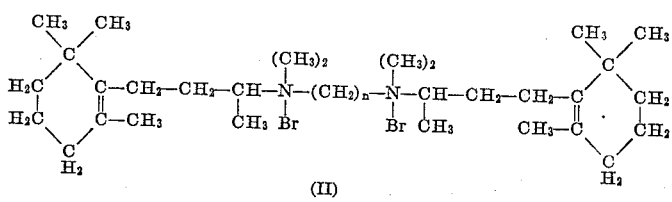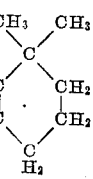

(II)

wherein $n$ is an integer from 2 to 10, inclusive.

The novel compounds of this invention are prepared by reacting two molecular proportions of a [1-methyl-3-(2,6,6 - trimethyl-1-cyclohexen-1-yl)butyl]dilower alkylamine or a [2-methyl-4-(2,6,6-trimethyl-1-cyclohexen-1-yl)butyl]dilower alkylamine with one molecular proportion of an α,ω-dihaloalkane, preferably in a solvent such as ethanol or acetonrtrile, while heating, say at reflux temperature. The [1-methyl-3-(2,6,6-trimethyl-1-cyclohexen-1-yl)propyl]dilower alkylamine and [2-methyl-4-(2,6,6-trimethyl-1-cyclohexen-1-yl)butyl]dilower alkylmine starting materials can be prepared by first reductively condensing β-ionone or 4-(2,6,6-trimethyl-1-cyclohexen-1-yl)-2-methyl-2-buten-1-al with a lower alkylamine and then alkylating the products thus obtained, for example, with formic acid and formalydeyde. Certain intermediates are novel and are also within the scope of this invention.

The compounds of this invention are useful as antimicrobial agents. They are active against bacteria and fungi, such as *Trichophyton mentagrophytes* and *Microsporon lanosum*, and are also active against *Trichomonas vaginalis*. They are particularly useful as local antiseptics and may be applied topically, for example by incorporating them in conventional ointments and lotions for topical application.

The following examples are illustrative of the invention. All temperatures are in degrees centigrade.

Example 1

5 tsps. of Raney nickel catalyst were added to a solution of 250 g. (1.3 mols) of β-ionone and 200 g. (5.3 mols) of anhydrous methylamine in 400 ml. of ethanol. The mixture was hydrogenated at 150° and 1500 p.s.i. The catalyst was filtered off, the excess methylamine and methanol were distilled off and the residual oil was fractionated in vacuo to obtain [1-methyl-3-(2,6,6-trimethyl-1-cyclohexen-1-yl)propyl]methylamine, B.P.$_5$ 117–119°.

To 62 g. (0.3 mol) of [1-methyl-3-(2,6,6-trimethyl-1-cyclohexen-1-yl)propyl]methylamine, dissolved in 38 ml. (0.75 mol) of 90% formic acid, was added 28.5 ml. (0.35 mol) of 35% formaldehyde. The solution was stirred on a steam bath for 3 hours and the excess formaldehyde and formic acid were then distilled off. The residual oil was made strongly alkaline with 50% potassium hydroxide and extracted with ether. The ether extract was washed with water, dried with potassium carbonate and the ether was then distilled off. The residual oil was fractionated in vacuo to obtain [1-methyl-3-(2,6,6-trimethyl-1-cyclohexen-1 - yl(propyl]-dimethylamine, B.P.$_2$ 97–99°.

An aliquot of the above free base when neutralized with oxalic acid dissolved in ethanol gave the crystalline [1 - methyl - 3 - (2,6,6-trimethyl-1-cyclohexen-1-yl)-propyl]dimethylamine monooxalate, M.P. 189–190°. An aliquot of the above free base when neutralized with alcoholic hydrogen chloride gave the crystalline [1-methyl - 3 - (2,6,6-trimethyl-1-cyclohexen-1-yl)propyl]-dimethyl-amine hydrochloride, M.P. 69–71° (crystallized from acetonitrile-ether).

13.4 g. (0.06 mol) of [1-methyl-3-(2,6,6-trimethyl-1-cyclohexen-1-yl)]dimethylamine and 6.1 g. (0.03 mol) of 1,3-dibromo-propane were dissolved in 150 ml. absolute ethanol and refluxed for 72 hours. The colorless solution was concentrated to a syrup at steam temperature and under water vacuum. The syrup was triturated with ether and crystallized from acetone-ether to obtain N,N'-bis-[1-methyl-3-(2,6,6-trimethyl-1-cyclohexen-1-yl)-propyl] - N,N'-dimethyl-1,3-propanediamine bis(methobromide) dihydrate, M.P. 195–196°.

Example 2

13.4 g. (0.06 mol) of [1-methyl-3-(2,6,6-trimethyl-1-cyclohexen-1-yl)propyl]dimethylamine and 6.5 g. (0.03 mol) of 1,4-dibromobutane were reacted according to the procedure described in Example 1 and the product crystallized from acetonitrile-acetone. The N,N'-bis-[1-methyl-3-(2,6,6-trimethyl - 1 - cyclohexen-1-yl)propyl]-N,N'-dimethyl - 1,4 - butanediamine bis(methobromide) hemihydrate thus obtained melted at 231–233° with dec.

Example 3

13.4 g. (0.06 mol) of [1-methyl-3-(2,6,6-trimethyl-1-cyclohexen-1-yl)propyl]dimethylamine and 6.9 g. (0.03 mol) of 1,5-dibromopentane were reacted according to the procedure described in Example 1. The crude product was crystallized from acetonitrile-ether to obtain N,N'-bis-[1-methyl-3-(2,6,6 - trimethyl - 1 - cyclohexen-1-yl)-propyl]-N,N'-dimethyl-1,5-pentanediamine bis(methobromide) sesquihydrate, melted at 233–235°, with dec.

Example 4

13.4 g. (0.06 mol) of [1-methyl-3-(2,6,6-trimethyl-1-cyclohexen-1-yl)propyl]dimethylamine and 7.3 g. (0.03 mol) of 1,6-dibromohexane were dissolved in 60 ml. of warm acetonitrile and refluxed. After 15 minutes crystals formed. The mixture was stirred and refluxed for 18 hours and then cooled. The N,N'-bis-[1-methyl-3-(2,6,6-trimethyl - 1 - cyclohexen-1-yl)propyl] - N,N' - dimethyl-1,6-hexanediamine bis(methobromide) monohydrate crystals thus obtained were filtered off, washed with a minimum of cold acetonitrile and dried, M.P. 245–246°, with dec.

Example 5

13.4 g. (0.06 mol) of [1-methyl-3-(2,6,6-trimethyl-1-cyclohexen-1-yl)propyl]dimethylamine and 7.0 g. (0.03 mol) of 1,7-dibromoheptane were reacted according to the procedure described in Example 1. The N,N'-bis-[1-methyl-3-(2,6,6-trimethyl - 1 - cyclohexen - 1 - yl)propyl]-N,N'-dimethyl - 1,7 - heptanediamine bis(methobromide)dihydrate thus obtained was recrystallized from ethanol-petroleum ether, M.P. 218–219°.

Example 6

3 tsps. of Raney nickel catalyst were added to a solution of 200 g. (1 mol) of 4-(2,6,6-trimethyl-1-cyclohexen-1-yl)-2-methyl-2-buten-1-al and 115 g. of anhydrous methylamine in 300 ml. of methanol. The mixture was hydrogenated at 150° and 1500 p.s.i. The catalyst was filtered off, and the excess methylamine and methanol distilled off. To the residual oil, dissolved in 114 ml. of 90% formic acid, were added 85.5 ml. of 35% formaldehyde. The solution was stirred on a steam bath for 3 hours and the excess formaldehyde and formic acid were then distilled off. The residual oil was made strongly alkaline with 50% potassium hydroxide and extracted with ether. The ether extract was washed with water, dried with potassium carbonate and the ether distilled off. The residual oil was fractionated in vacuo to obtain N-[2-methyl-4-(2,6,6 - trimethyl - 1 - cylohexen - 1 - yl)butyl]-dimethylamine, B.P.$_{0.4}$ 100°.

23.7 g. (0.1 mol) of N-[2-methyl-4-(2,6,6-trimethyl-1-cyclohexen-1-yl)butyl]dimethylamine and 12.2 g. (0.05 mol) of 1,6-dibromohexane were dissolved in 200 ml. of acetonitrile and treated according to the procedure described in Example 4. The N,N'-bis-[2-methyl-4-(2,6,6-trimethyl - 1 - cyclohexen - 1 - yl)butyl]-N,N'-dimethyl-1,6-hexanediamine bis(methobromide) dihydrate obtained by this procedure was recrystallized from isopropanol, M.P. 225–226°, with dec.

Example 7

23.7 g. (0.1 mol) of [1-methyl-3-(2,6,6-trimethyl-1-cyclohexen-1-yl)propyl]dimethylamine and 9.4 g. (0.05 mol) of 1,2-dibromoethane were dissolved in 200 ml. of acetonitrile and treated according to the procedure described in Example 4. The N,N'-bis-[1-methyl-3-(2,6,6-trimethyl - 1 - cyclohexen - 1 - yl)propyl]-N,N'-dimethyl-1,2-ethylenediamine bis(methobromide)monohydrate obtained by this procedure was crystallized from acetone-ether, M.P. 157–158°, with dec.

Example 8

11.8 g. (0.05 mol) of [1-methyl-3-(2,6,6-trimethyl-1-cyclohexen-1-yl)propyl]dimethylamine and 7.5 g. (0.025 mol) of 1,10-dibromodecane were reacted according to the procedure described in Example 4. The N,N'-bis-[1-methyl-3-(2,6,6-trimethyl - 1 - cyclohexen - 1 - yl)propyl]-N,N'-dimethyl - 1,10 - decanediamine bis(methobromide) sesquihydrate obtained by this procedure was crystallized from ethanol-acetone-ether, M.P. 190–192°.

We claim:

1. A compound represented by the formula

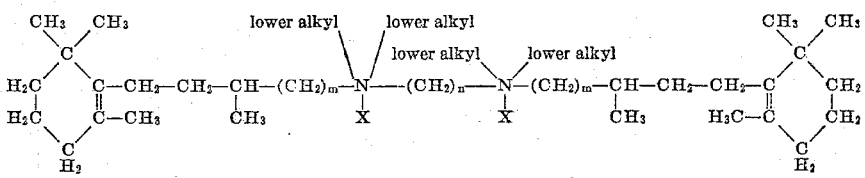

wherein $m$ represents an integer from 0 to 1, $n$ represents an integer from 2 to 10, and X is an anion selected from the group consisting of anions of mineral acids and arylsulfonic acids.

2. A compound selected by the formula

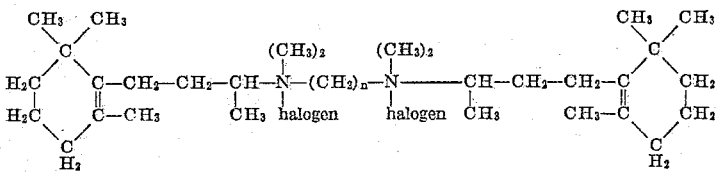

wherein $n$ is an integer from 2 to 10, inclusive, and halogen represents a member of the group consisting of chlorine, bromine and iodine.

3. A compound represented by the formula

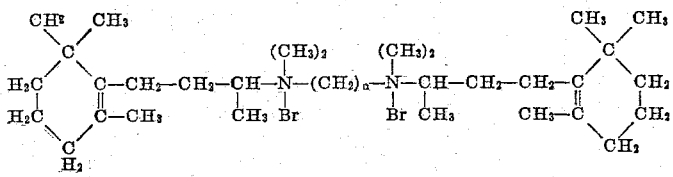

wherein $n$ is an integer from 2 to 10, inclusive.

4. N,N'-bis-[1 - methyl-3-(2,6,6-trimethyl-1-cyclohexen-1-yl)propyl] - N,N' - dimethyl - 1,6 - hexanediamine-bis-(lower alkyl halide), said halide being selected from the group consisting of chloride, bromide and iodide.

5. N,N'-bis-[1 - methyl-3-(2,6,6-trimethyl-1-cyclohexen-1-yl)propyl]-N,N'-dimethyl-1,6-hexanediamine bis(methobromide).

6. N,N'-bis-[1 - methyl-3-(2,6,6-trimethyl-1-cyclohexen-1-yl)propyl]-N,N'-dimethyl-1,5-pentanediamine bis(lower alkyl halide), said halide being selected from the group consisting of chloride, bromide and iodide.

7. N,N'-bis-[1 - methyl-3-(2,6,6-trimethyl-1-cyclohexen-1-yl)propyl]-N,N'-dimethyl-1,5-pentanediamine bis(methobromide).

8. A compound selected from the group consisting of a base represented by the formula

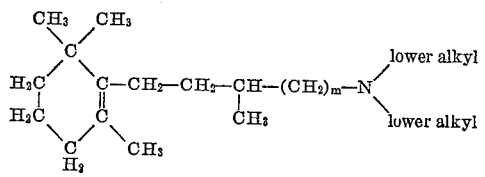

wherein $m$ represents an integer from 0 to 1 and mineral acid, oxalic acid, and arylsulfonic acid addition salts thereof.

9. [1-methyl-3-(2,6,6-trimethyl - 1 - cyclohexen-1-yl)-propyl]-dimethylamine.

10. [1-methyl-3-(2,6,6-trimethyl - 1 - cyclohexen-1-yl)-propyl]-dimethylamine oxalate.

11. [2-methyl-4-(2,6,6-trimethyl - 1 - cyclohexen-1-yl)-butyl]-dimethylamine.

References Cited in the file of this patent
UNITED STATES PATENTS

| | | |
|---|---|---|
| 2,736,746 | Goldberg et al. | Feb. 28, 1956 |
| 2,736,747 | Goldberg et al. | Feb. 28, 1956 |
| 2,767,168 | Cheney | Oct. 16, 1956 |
| 2,933,530 | Kralt et al. | Apr. 19, 1960 |

UNITED STATES PATENT OFFICE
CERTIFICATE OF CORRECTION

Patent No. 3,064,039            November 13, 1962

Moses Wolf Goldberg et al.

It is hereby certified that error appears in the above numbered patent requiring correction and that the said Letters Patent should read as corrected below.

Column 1, line 52, for "butyl" read -- propyl --; line 64, for "formalydeyde" read -- formaldehyde --; column 2, line 29, for "(0.35 mol)" read -- (0.33 mol) --; column 4, line 54, for "selected" read -- represented --.

Signed and sealed this 8th day of October 1963.

(SEAL)
Attest:

ERNEST W. SWIDER
Attesting Officer

EDWIN L. REYNOLDS
Acting Commissioner of Patents